(12) United States Patent
Hughes et al.

(10) Patent No.: US 7,550,693 B2
(45) Date of Patent: Jun. 23, 2009

(54) HAND-HELD LASER WELDING WAND WITH IMPROVED OPTICAL ASSEMBLY SERVICEABILITY FEATURES

(75) Inventors: Thomas M. Hughes, Greer, SC (US); Clyde R. Taylor, Laurens, SC (US)

(73) Assignee: Honeywell International Inc., Morristown, NJ (US)

( * ) Notice: Subject to any disclaimer, the term of this patent is extended or adjusted under 35 U.S.C. 154(b) by 638 days.

(21) Appl. No.: 11/051,218

(22) Filed: Feb. 4, 2005

(65) Prior Publication Data

US 2006/0175307 A1     Aug. 10, 2006

(51) Int. Cl.
B23K 26/00    (2006.01)

(52) U.S. Cl. .................................. 219/121.63

(58) Field of Classification Search ............ 219/121.63, 219/121.64, 121.84
See application file for complete search history.

(56) References Cited

U.S. PATENT DOCUMENTS

| | | | |
|---|---|---|---|
| 3,114,826 A | | 12/1963 | Sullivan et al. |
| 3,179,782 A | | 4/1965 | Matvay |
| 3,242,314 A | | 3/1966 | Eckles |
| 3,313,908 A | | 4/1967 | Unger et al. |
| 3,610,875 A | * | 10/1971 | Dal Molin ............. 219/137.63 |
| 3,652,954 A | | 3/1972 | Snitzer |
| 3,696,230 A | | 10/1972 | Friedrich |
| 3,821,510 A | | 6/1974 | Muncheryan |
| 3,843,865 A | | 10/1974 | Nath |
| 3,910,346 A | * | 10/1975 | ter Braak ................. 165/109.1 |
| 4,010,797 A | * | 3/1977 | Parnkopf et al. ............ 165/159 |
| 4,103,255 A | * | 7/1978 | Schlossberg .................. 372/64 |
| 4,164,826 A | * | 8/1979 | Metzler et al. ............. 43/42.05 |
| 4,274,587 A | * | 6/1981 | Cioffi et al. .............. 239/132.3 |
| 4,324,972 A | * | 4/1982 | Furrer et al. ............ 219/121.84 |
| 4,431,607 A | * | 2/1984 | Casperson .................. 422/150 |
| 4,436,978 A | | 3/1984 | Lemelson |
| 4,468,897 A | * | 9/1984 | Merrel ....................... 451/435 |
| 4,564,736 A | | 1/1986 | Jones et al. |
| 4,607,151 A | * | 8/1986 | Kihlstrom ................... 219/230 |
| 4,673,795 A | | 6/1987 | Ortiz, Jr. |
| 4,757,515 A | | 7/1988 | Hughes |
| 4,788,408 A | * | 11/1988 | Wlodarczyk et al. ... 219/121.49 |
| 4,906,812 A | | 3/1990 | Nied et al. |
| 5,074,861 A | | 12/1991 | Schneider et al. |
| 5,199,870 A | | 4/1993 | Steiner et al. |
| 5,221,045 A | * | 6/1993 | McAninch et al. ............. 239/1 |
| 5,282,370 A | * | 2/1994 | Kiblawi et al. ................ 62/503 |
| 5,296,671 A | * | 3/1994 | Torii et al. ............. 219/121.78 |
| 5,311,529 A | | 5/1994 | Hug |
| 5,321,228 A | * | 6/1994 | Krause et al. .......... 219/121.84 |
| 5,362,939 A | * | 11/1994 | Hanus et al. ........... 219/121.59 |

(Continued)

FOREIGN PATENT DOCUMENTS

JP     359224816 A  * 12/1984

*Primary Examiner*—Samuel M Heinrich
(74) *Attorney, Agent, or Firm*—Ingrassia Fisher & Lorenz, P.C.

(57) ABSTRACT

A hand-held laser welding wand includes internal flow passages through which filler media, gas, and coolant may flow. The wand is dimensioned to be grasped with a single hand, and includes an optics assembly disposed therein. The wand is configured such that the optics assembly, or portions thereof, may be readily serviced without having to breach coolant seals or remove a plurality of threaded screws.

22 Claims, 6 Drawing Sheets

U.S. PATENT DOCUMENTS

| | | | |
|---|---|---|---|
| 5,391,237 A * | 2/1995 | Vial et al. ................... 148/205 |
| 5,401,171 A | 3/1995 | Paghdiwala |
| 5,418,350 A * | 5/1995 | Freneaux et al. ....... 219/121.84 |
| 5,426,278 A | 6/1995 | Hirano et al. |
| 5,477,025 A | 12/1995 | Everett et al. |
| 5,486,676 A | 1/1996 | Aleshin |
| 5,548,604 A | 8/1996 | Toepel |
| 5,556,560 A * | 9/1996 | Ahola et al. ........... 219/121.45 |
| 5,786,561 A * | 7/1998 | Zefferer et al. ......... 219/121.84 |
| 5,909,535 A * | 6/1999 | Curwick et al. ............. 392/476 |
| 5,928,220 A * | 7/1999 | Shimoji ......................... 606/2 |
| 5,993,550 A | 11/1999 | Eloy |
| 6,000,465 A * | 12/1999 | Kawahara ................... 165/132 |
| 6,060,686 A | 5/2000 | Jones |
| 6,236,013 B1 * | 5/2001 | Delzenne ............... 219/121.54 |
| 6,442,180 B1 | 8/2002 | Gurrieri et al. |
| 6,593,540 B1 | 7/2003 | Baker et al. |
| 6,607,524 B1 | 8/2003 | LaBudde et al. |
| 6,610,053 B1 | 8/2003 | Rizoiu et al. |
| 6,696,664 B2 | 2/2004 | Pyritz et al. |
| 6,914,211 B2 * | 7/2005 | Brasseur et al. .......... 219/121.5 |
| 7,009,141 B1 * | 3/2006 | Wool et al. ............. 219/121.73 |
| 7,038,164 B2 * | 5/2006 | Denney et al. ......... 219/121.67 |
| 7,101,425 B2 * | 9/2006 | Kiss ........................... 96/300 |
| 7,431,711 B2 * | 10/2008 | Moutafis et al. ............... 604/22 |
| 2004/0120162 A1 * | 6/2004 | Tsimerman et al. ......... 362/573 |

* cited by examiner

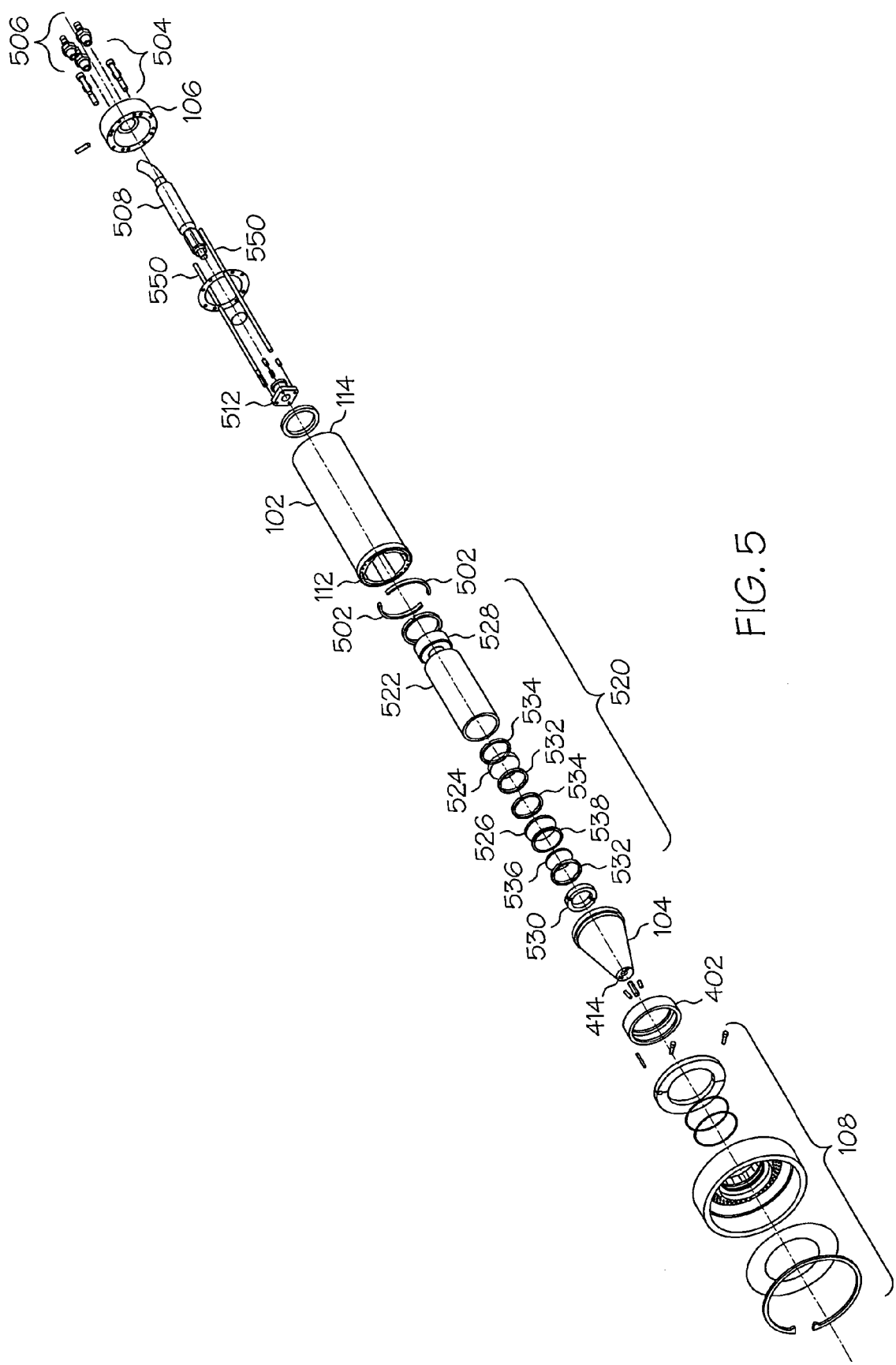

HAND-HELD LASER WELDING WAND WITH IMPROVED OPTICAL ASSEMBLY SERVICEABILITY FEATURES

FIELD OF THE INVENTION

The present invention relates to laser welding and, more particularly, to a hand-held laser welding wand that includes various features that improve the serviceability of the wand and, in particular, the wand optical assembly.

BACKGROUND OF THE INVENTION

Many components in a jet engine are designed and manufactured to withstand relatively high temperatures. Included among these components are the turbine blades, vanes, and nozzles that make up the turbine engine section of the jet engine. In many instances, various types welding processes are used during the manufacture of the components, and to repair the components following a period of usage. Moreover, various types of welding technologies and techniques may be used to implement these various welding processes. However, one particular type of welding technology that has found increased usage in recent years is laser welding technology.

Laser welding technology uses a high power laser to manufacture parts, components, subassemblies, and assemblies, and to repair or dimensionally restore worn or damaged parts, components, subassemblies, and assemblies. In general, when a laser welding process is employed, laser light of sufficient intensity to form a melt pool is directed onto the surface of a metal work piece, while a filler material, such as powder, wire, or rod, is introduced into the melt pool. Until recently, such laser welding processes have been implemented using laser welding machines. These machines are relatively large, and are configured to run along one or more preprogrammed paths.

Although programmable laser welding machines, such as that described above, are generally reliable, these machines do suffer certain drawbacks. For example, a user may not be able to manipulate the laser light or work piece, as may be needed, during the welding process. This can be problematic for weld processes that involve the repair or manufacture of parts having extensive curvature and/or irregular or random distributed defect areas. Thus, in order to repair or manufacture parts of this type, the Assignee of the present application developed a portable, hand-held laser welding wand. Among other things, this hand-held laser welding wand allows independent and manual manipulation of the laser light, the filler material, and/or the work piece during the welding process. An exemplary embodiment of the hand-held laser welding wand is disclosed in U.S. Pat. No. 6,593,540, which is entitled "Hand Held Powder-Fed Laser Fusion Welding Torch," and the entirety of which is hereby incorporated by reference.

The hand-held laser welding wand, such as the one described above, provides the capability to perform manual 3-D adaptive laser welding on workpieces of differing types, materials, and configurations. Hence, filler media of various types and forms is supplied to the weld area on a workpiece. In addition, many laser welding processes are conducted in the presence of an inert shield gas. Thus, gas may need to be supplied to the hand-held laser welding wand during some welding processes. Moreover, during operation of the hand-held laser welding wand, the wand may heat up. Thus, a way of cooling the wand may be needed. With conventional laser welding devices, external supplies of gas, coolant, and filler media are coupled to the devices via external conduits, tubing, and/or wiring. Such external systems and supply devices can make the use of the hand-held laser welding wand cumbersome, these systems and supply devices can impair an operator, and/or can interfere with the wand operations.

In response to the above-noted needs, the Assignee of the present application invented a hand-held laser welding wand that can be used to supply various types and forms of filler media to a workpiece via various types of delivery systems, and that can be supplied with gas and/or coolant in a manner that is not cumbersome, does not impair wand operability, and does not interfere with wand operations. This invention is disclosed in U.S. patent application Ser. No. 10/721,632, which is entitled "Hand-Held Laser Welding Wand Having Internal Coolant and Gas Delivery Conduits," and the entirety of which is hereby incorporated by reference.

Although quite effective in meeting each of the above-stated goals, the inventive wand also evidences certain drawbacks. For example, the wand main body has an optics assembly disposed therein, which is periodically removed for maintenance. In order to remove the optics assembly, the end cap is removed from the main body, which disturbs a cooling water seal that is disposed between the end cap and the main body. Typically, the cooling water seal is a sealant-coated copper gasket. There is an additional cooling water seal of this type between the nozzle and the main body.

The sealant-coated copper gaskets used in the wand are quite effective and robust. However, before reinstalling these seals following optics assembly maintenance, the seals and mating surfaces are thoroughly cleaned and coated with sealant. This operation is preferably conducted in a clean environment, and care is taken to avoid scratching the gaskets and/or mating surfaces. This can be a time consuming process, and can increase overall maintenance costs.

Hence, there is a need for a hand-held laser welding wand that does not rely on removal of a potentially maintenance-intensive coolant seal to remove the optics assembly. The present invention addresses at least this need.

SUMMARY OF THE INVENTION

The present invention provides a hand-held laser welding wand that does not rely on removal of a potentially maintenance-intensive coolant seal to remove the optics assembly.

In one embodiment, and by way of example only, a hand-held laser fusion welding assembly adapted to couple to a laser delivery system, a gas supply system, and a coolant supply system, includes a nozzle and a main body. The nozzle has an aperture through which laser light from the laser delivery system and gas from the gas delivery system passes. The main body is dimensioned to be grasped by a hand and is adapted to couple to the laser delivery system, the gas supply system, and the coolant supply system. The main body has a first end, a second end, a gas flow passage, a coolant inlet flow passage, a coolant outlet flow passage, and a fixedly sealed crossover flow channel. The main body first end is coupled to the nozzle. The gas flow passage extends through the main body and includes a gas inlet port formed in main body second end, and a gas outlet port formed in the main body first end. The coolant inlet flow passage has a coolant inlet port formed in the main body second end and extends at least partially into the main body to a fixedly sealed end. The coolant outlet flow passage has a coolant outlet port formed in the main body second end and extends at least partially into the main body to a fixedly sealed end. The fixedly sealed crossover channel is formed within the main body that couples the ends of the coolant inlet and outlet flow passages in fluid communication with one another.

In another exemplary embodiment, a hand-held laser fusion welding assembly includes a main body, a nozzle, and a nozzle retainer ring. The main body is dimensioned to be grasped by a hand and is adapted to couple to a laser delivery system and to a gas supply system. The main body has at least a first end and a second end and an internal gas flow passage through which gas from the gas supply system passes. The nozzle is disposed adjacent the main body first end, and has at least an aperture in fluid communication with the internal gas flow passage through which laser light from the laser delivery system and gas from the gas supply system pass. The nozzle retainer ring is coupled to the main body and the nozzle, and is configured to couple the nozzle to the main body first end.

Other independent features and advantages of the preferred welding wand will become apparent from the following detailed description, taken in conjunction with the accompanying drawings which illustrate, by way of example, the principles of the invention.

BRIEF DESCRIPTION OF THE DRAWINGS

FIG. 5 is a perspective exploded view of the hand-held laser welding wand of FIGS. 1-4;

DETAILED DESCRIPTION OF A PREFERRED EMBODIMENT

Figure 1:
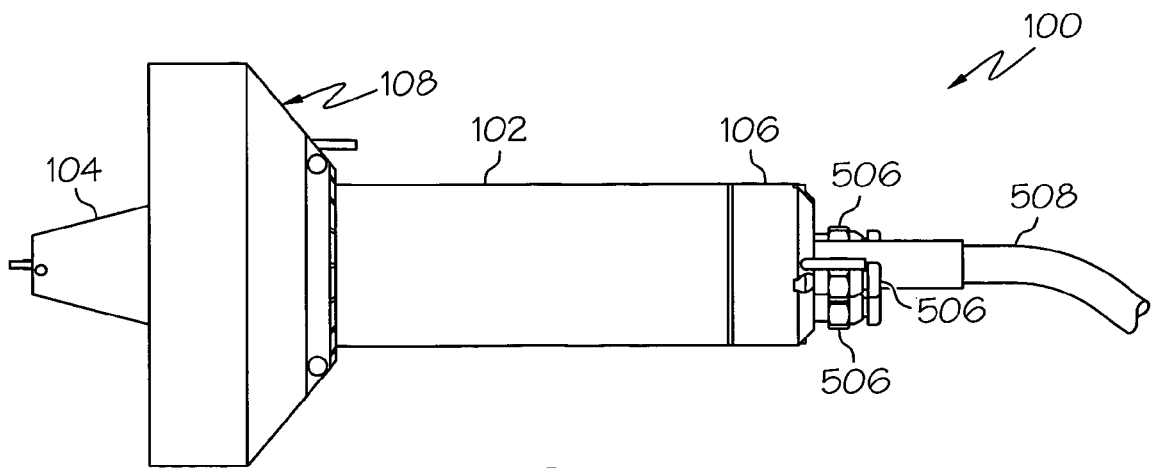
FIGS. 1-3 are side, front end, and rear end views, respectively, of an exemplary hand-held laser welding wand.
Figure 2:
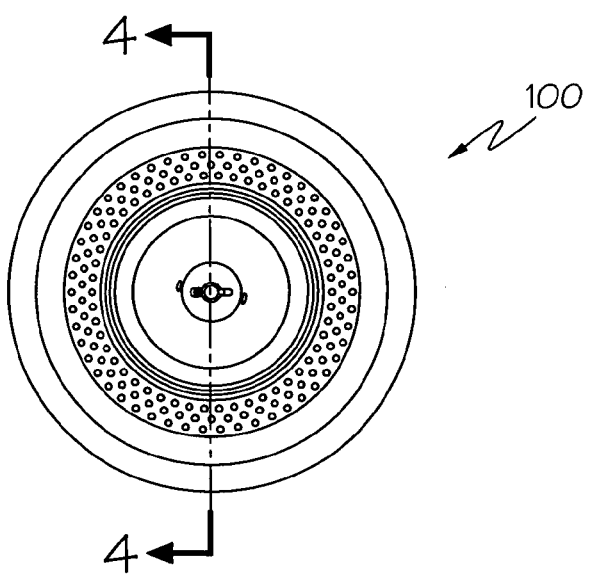
Figure 3:
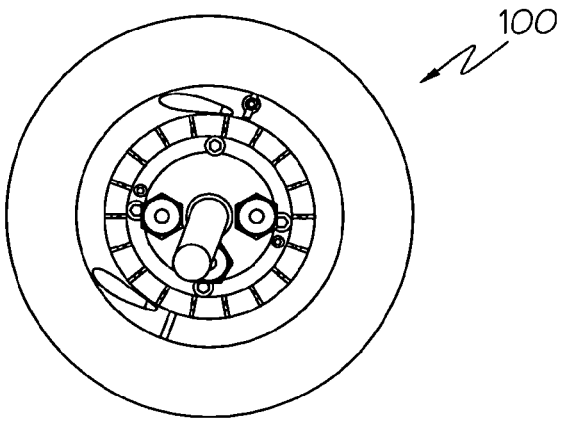
Figure 4:
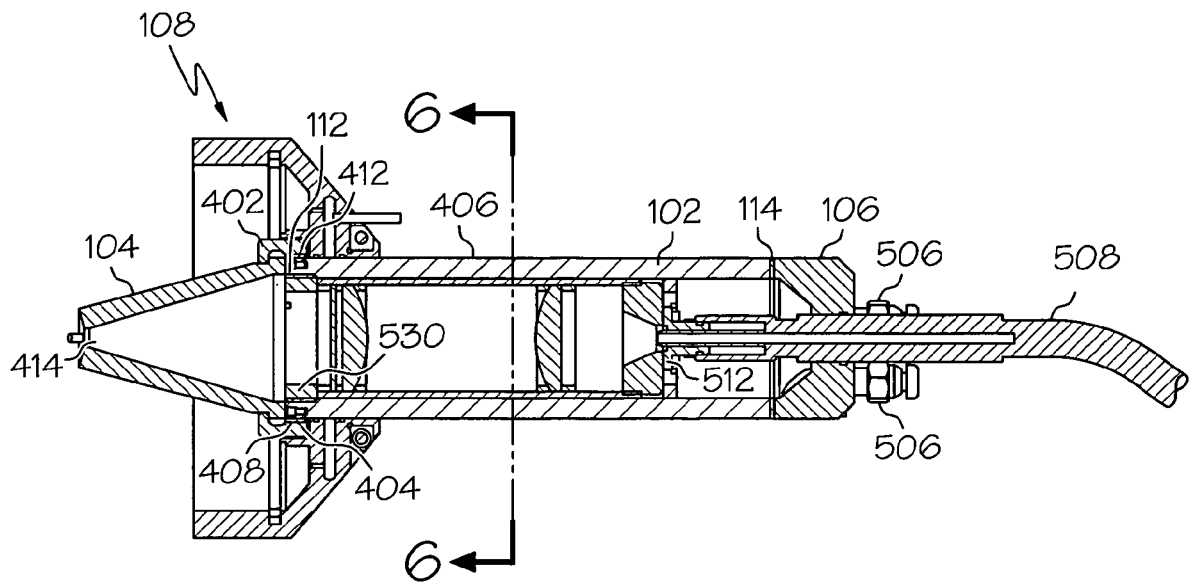
FIG. 4 is a cross section view of the hand-held laser welding wand of FIGS. 1-3, taken along line 4-4 in FIG. 2.

Before proceeding with the detailed description, it should be appreciated that the following detailed description is merely exemplary in nature and is not intended to limit the invention or the application and uses of the invention. Furthermore, there is no intention to be bound by any theory presented in the preceding background or the following detailed description.

Turning now to the description, and with reference first to FIGS. 1-5, an exemplary hand-held laser welding wand 100 is shown, and includes a main body 102, a nozzle 104, an end cap 106, and a gas lens assembly 108. The main body 102, which is preferably configured as a hollow tube, includes a first end 112 (see FIGS. 4 and 5) and a second end 114. The main body 102 additionally includes a plurality of orifices and flow passages. These orifices and flow passages are used to direct various fluids and other media into and through the main body 102. Included among these media are a coolant medium, such as water, an inert gas medium, such as Argon, and a filler material medium, such as powder, wire, or liquid. As will be described further below, some of these orifices and flow passages are in fluid communication with orifices and flow passages in both the nozzle 104 and the end cap 106. The main body orifices and flow passages will now be described. The concomitant filler media orifices and flow passages in the nozzle 104 and end cap 106 will also be described when these components are separately described further below.

Figure 6:
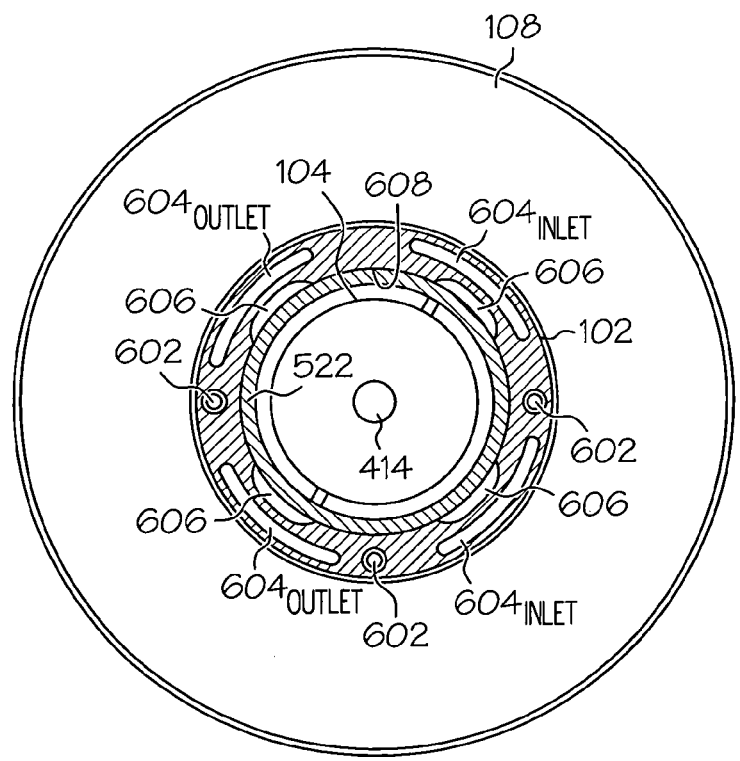
FIG. 6 is a cross section view of the hand-held laser welding wand taken along line 6-6 of FIG. 1.
Figure 7:
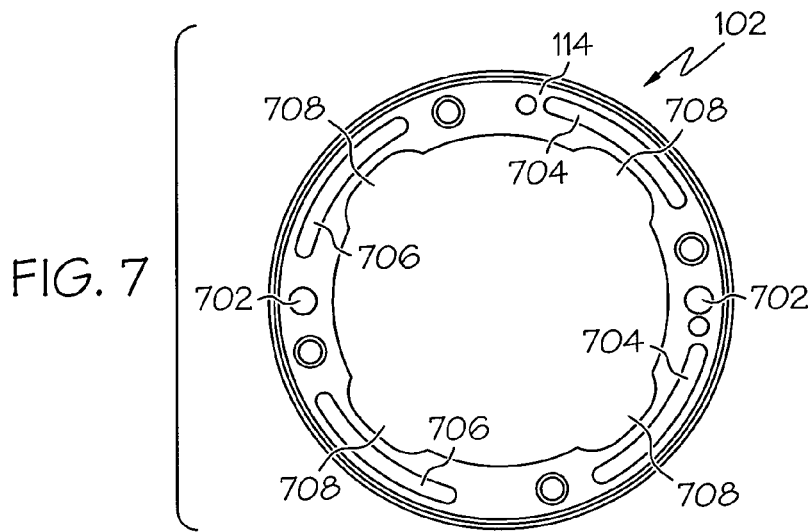
FIGS. 7 and 8 are end views of an exemplary main body portion of the hand-held laser welding wand shown in FIGS. 1-5.
Figure 8:
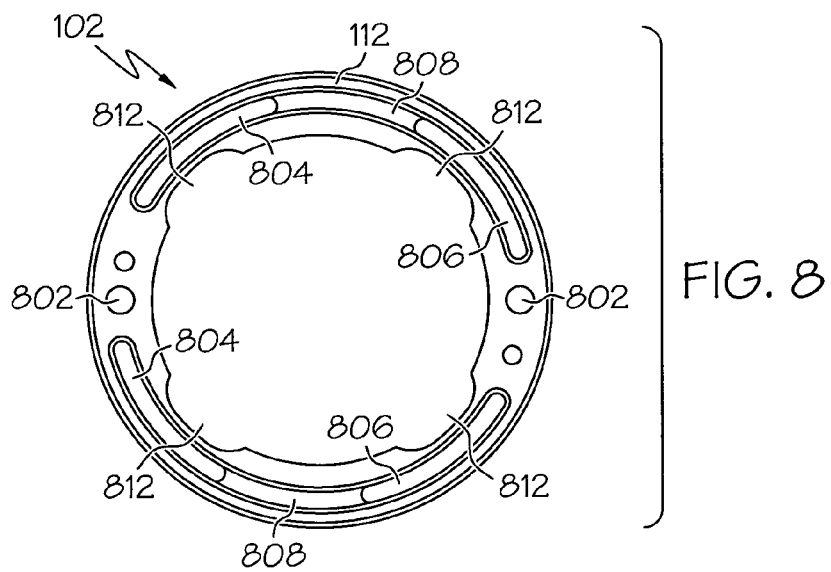

With reference now to FIGS. 6-8, it is seen that the main body 102 includes one or more filler media flow passages 602, one or more coolant flow passages 604, and one or more gas flow passages 606. In the depicted embodiment, the main body 102 includes two filler media flow passages 602, which are disposed on opposing sides of the main body 102. The filler media flow passages 602, as shown most clearly in FIGS. 7 and 8, each include an inlet port 702 (see FIG. 7) and an outlet port 802 (see FIG. 8). The filler media inlet ports 802 are formed in the main body second end 114, and the filler outlet ports 802 are formed in the main body first end 112. The main body filler media flow passages 602 may be used to supply filler media to a work piece.

The main body 102 additionally includes four coolant flow passages 604 that extend partially through the main body 102. Two of the coolant flow passages function as inlet flow passages $604_{INLET}$, and the remaining two coolant flow passages function as outlet flow passages $604_{OUTLET}$. The coolant inlet flow passages $604_{INLET}$ each include an inlet port 704 that is formed in the main body second end 114, and extend partially through the main body 102 to an end 804 (see FIG. 8) that, in the depicted embodiment, is disposed proximate the main body first end 112. The coolant outlet flow passages $604_{OUTLET}$ each include an outlet port 706 that is also formed in the main body second end 114, and extend partially through the main body 102 to an end 806 (see FIG. 8) that, in the depicted embodiment, is also disposed proximate the main body first end 112.

With continued reference to FIG. 8, it is seen that two coolant crossover flow channels 808 are formed proximate the main body first end 112. The crossover flow channels 808 each fluidly communicate a pair of the inlet and outlet flow passage ends 804, 806 with one another. Thus, coolant supplied to the coolant inlet ports 704 flows through the coolant inlet flow passages $604_{INLET}$ toward the inlet flow passage ends 804. When the coolant reaches the inlet flow passage ends 804, the coolant is directed into and through the coolant crossover channels 808, toward the outlet flow passage ends 806, and then into and through the coolant outlet flow passages $604_{OUTLET}$. The coolant then flows out the outlet ports 706 formed in the main body second end 114.

Figure 9:
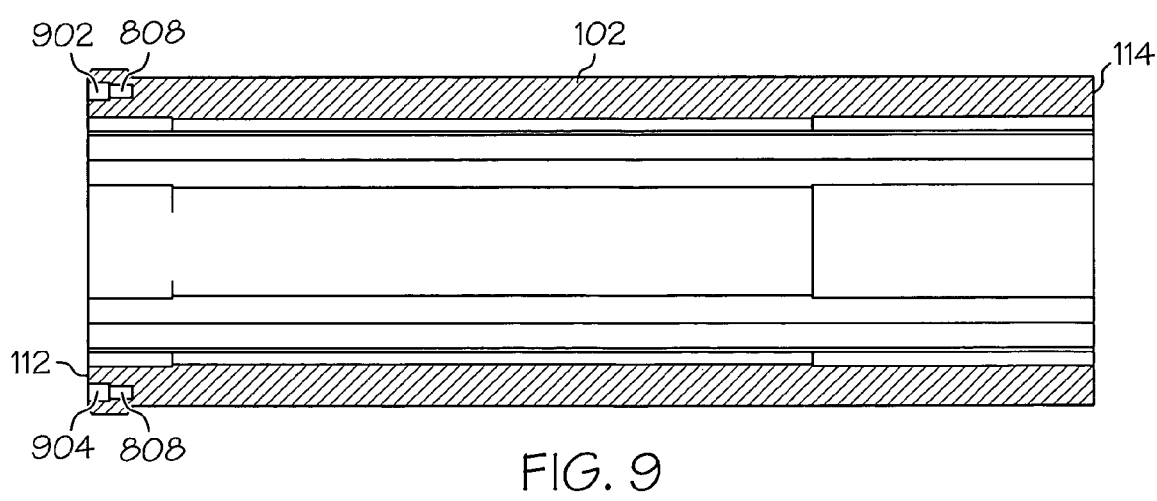
FIG. 9 is a cross section view of the exemplary main body portion shown in FIGS. 7 and 8, taken along line 9-9 in FIG. 8.

It will be appreciated that in order to implement the above-noted coolant circulation flow, the inlet and outlet flow passage ends 804, 806 and the crossover flow channels 808 are preferably sealed. Although this could be done in any one of numerous ways, in the depicted embodiment the inlet and outlet flow passage ends 804, 806 and the crossover flow channels 808 are fixedly sealed. More specifically, and with reference now to FIG. 9 in combination with FIG. 8, it is seen that a pair of grooves 902, 904 are formed in the main body first end 112, and that each pair of inlet and outlet flow passage ends 804, 806 and each of the crossover flow channels 808 are formed in one of the grooves 902, 904. The grooves 902, 904 are each configured to receive a crossover channel cover 502 (see FIG. 5). The crossover channel covers 502 are inserted into one of the grooves 902, 904 and fixedly coupled therein, preferably using a welding process.

It will be appreciated that the crossover channel covers 502, in addition to being configured to fit within one of the grooves 902, 904 and seal the inlet and outlet flow passage ends 804, 806 and the crossover flow channels 808, are also configured to be substantially flush with the main body first end 112 upon being fixed within the grooves 902, 904. It will additionally be appreciated that the above-described configuration and method of fixedly sealing the inlet and outlet flow passage ends 804, 806 and the crossover flow channels 808 is merely exemplary, and that other configurations and methods could be used. For example, the inlet and outlet flow passage ends 804, 806 and crossover flow channels 808 could be integrally formed within the main body 102.

Returning once again to FIGS. 6-8, the gas flow passages 606, at least in the depicted embodiment, are formed into an inner surface 608 of the hollow main body 102. It will be appreciated, however, that the gas flow passages 606 could be formed through the main body 102, similar to the filler media 602 and coolant 604 flow passages. The gas flow passages 606, similar to the filler media flow passages 602, each include an inlet port 708 formed in the main body second end 114, and an outlet port 812 formed in the main body first end 112. Thus, gas supplied to the gas flow passage inlet ports 708 flows through the gas flow passages 606, and out the gas flow passage outlet ports 812. The gas exiting the main body gas flow passage outlet ports 812 then flows through the nozzle 104, which will now be described.

Referring back to FIGS. 4 and 5, it is seen that the nozzle 104 is coupled to the main body first end 112 via a threaded nozzle retainer ring 402. More specifically, in the depicted embodiment the main body 102 has a plurality of threads 404 formed on its outer surface 406 adjacent the main body first end 112. Similarly, the nozzle retainer ring 402 has a plurality of threads 408 formed on its inner surface 412 that mate with the main body threads 404. Thus, the nozzle 104 is coupled to the main body 102 by abutting the nozzle 104 against the main body first end 112, sliding the nozzle retainer ring 402 over the nozzle 104, and threading the nozzle retainer ring 4xx onto the main body 102. It will be appreciated that the nozzle 104 could be coupled to the main body first end 112 in a different manner. For example, the nozzle 104 and main body 102 could be configured so that the nozzle 104 is threaded directly onto the main body first end 112.

The nozzle 104 includes an aperture 414 that extends through the nozzle 104. When the nozzle is coupled to the main body 102, the nozzle aperture is in fluid communication with the inside of the hollow main body 102, and the main body gas flow passage outlet ports 812. As will be described further below, it is through this aperture 414 that laser light and gas pass during laser welding operations.

Figure 10:
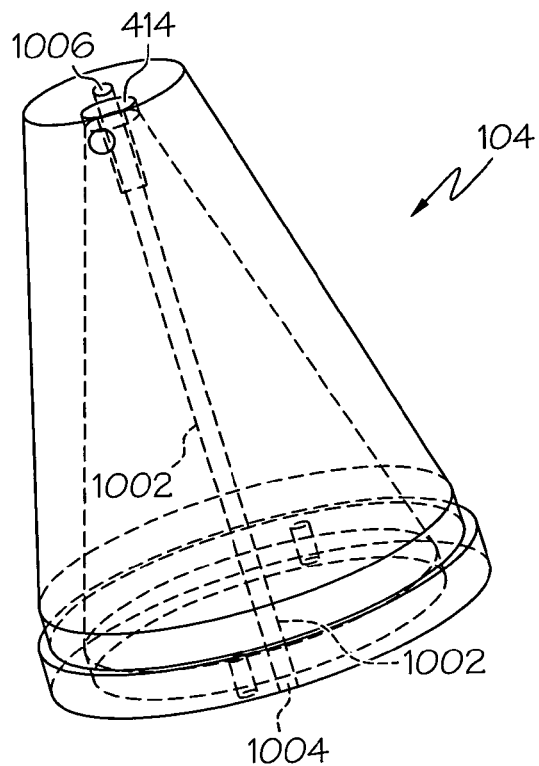
FIG. 10 is a perspective isometric view of an exemplary nozzle that may be used with the hand-held laser welding wand of FIGS. 1-5.

Turning now to FIG. 10, it is seen that the nozzle 104 additionally includes one or more filler media flow passages that, in conjunction with the main body filler media flow passages 602, are used to deliver a filler media to a work piece (not shown). In the depicted embodiment, the nozzle 104 includes two filler media flow passages 1002, each in fluid communication with one of the main body filler media flow passages 602. The nozzle filler media flow passages 1002, similar to the main body filler media flow passages 602, each include an inlet port 1004 and an outlet port 1006. When the nozzle 104 is coupled to the main body 102, each of the nozzle filler media flow passage inlet ports 1004 is collocated with one of the main body filler media flow passage outlet ports 802. The nozzle filler media outlet ports 1006 are preferably disposed on opposite sides the nozzle aperture 414, and are preferably dimensioned to receive an extension tube (not shown). A detailed description of the structure, function, and configuration of such extension tubes is not needed and, therefore, will not be provided.

Briefly referring back once again to FIGS. 4 and 5, in combination with FIGS. 11-14, the end cap 106 will now be described. The end cap 106 is coupled to the main body second end 114 via a plurality of end cap fasteners 504. In particular, the end cap fasteners 504 extend, one each, through a plurality of end cap fastener openings 1102 formed through the end cap 106, and into the main body second end 114. In addition to the end cap fastener openings 1102, the end cap 106 also includes a cable opening 1104, a plurality of filler media supply ports 1106, two coolant ports 1108, 1110, and a gas supply port 1112. A barbed fitting 506 (see FIG. 5) is preferably coupled to each of the coolant ports 1108, 1110, and the gas supply port 1112. These barbed fittings 506 may be used to couple the ports 1108-1112 to hoses or other flexible conduits (not shown) that are in fluid communication with a coolant source or a gas source (not shown), as may be appropriate.

Figure 11:
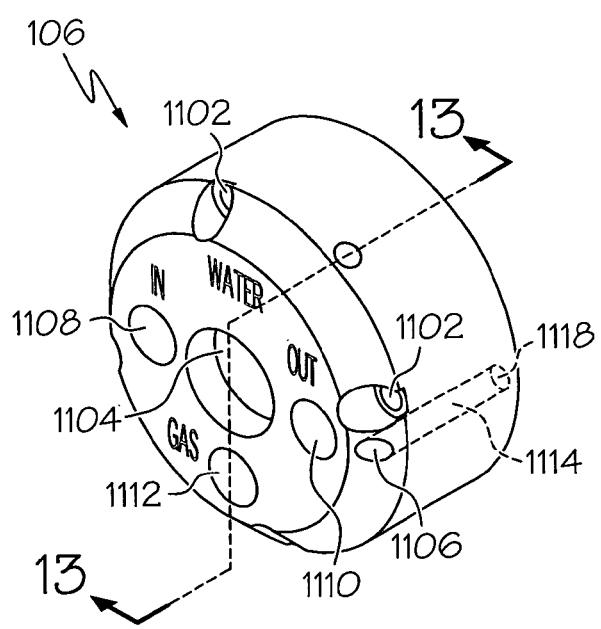
FIGS. 11 and 12 are perspective end views of an exemplary end cap that may be used with the hand-held laser welding wand of FIGS. 1-5.
Figure 12:
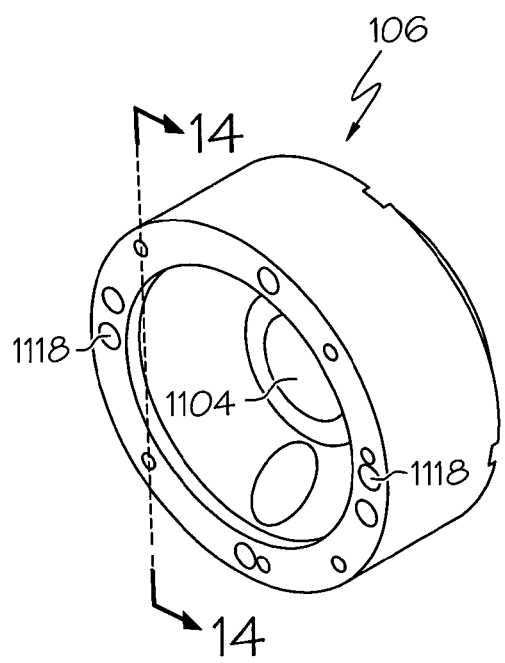

The end cap cable opening 1104 is adapted to receive an optical cable 508 (see FIG. 5) and, as shown most clearly in FIGS. 11 and 12, extends through the end cap 106. When the end cap 106 is coupled to the main body 102, the end cap cable opening 1104 is in fluid communication with the inside of the hollow main body 102 including, as will be further described below, the main body gas flow passage inlet ports 708. In particular, and with quick reference once again to FIGS. 4 and 5, the optical cable 508 is inserted into and through the end cap cable opening 1104, and is coupled to an optical receptacle 512 mounted within the main body 102. The optical cable 508 is used to transmit laser light from a laser source (not shown) into the main body 102. An optics assembly 520 is mounted within the main body 102 and is used to appropriately collimate and focus the laser light transmitted through the optical cable 508 and receptacle 512, such that the laser light passes through the nozzle aperture 414 and is focused on a point in front of the nozzle aperture 414. As may be seen by referring to FIG. 3, the optics assembly 520 also encloses the main body gas flow passages 606 that are formed on the main body inner surface 608. A brief description of an embodiment of the optics assembly 520 will now be provided. In doing so, reference should be made to FIG. 5.

The optics assembly 520 includes a lens tube 522, a first lens 553, a second lens 526, an optical adjustment screw 528, and a retaining ring stop 530. The lens tube 522 is preferably constructed of, or coated with, a material that is optically inert. For example, in the depicted embodiment, the lens tube 522 is constructed of black anodized aluminum. The first 553 and second 526 lenses are each mounted within the lens tube 522 via appropriate mounting hardware. In particular, each of the lenses 553, 526 is mounted between first and second retaining rings 532, 534. In addition, a lens cover 536 and lens cover spacer 538 are disposed in front of the second lens 526, providing physical protection for the second lens 526. The retaining ring stop 530, as its name connotes, retains the optics assembly 520 within the main body 102. In a particular preferred embodiment, the inner surface of the lens tube 522 and the outer surface of the retaining ring stop 530 are each threaded. Thus, removal of the retaining ring stop 530 allows the lenses 524, 526 to be readily removed from the lens tube 522.

With the above described configuration, laser light transmitted through the optical cable 508 and receptacle 512 passes through the first lens 553, which refracts the laser light so that it travels substantially parallel to the interior surface of the lens tube 522. The parallel laser light then passes through the second lens 526, which focuses the laser light to a point in front of the nozzle aperture 414. It will be appreciated that the location of point in front of the nozzle aperture 414 to which the laser light is focused is a function of the focal length of the second lens 526, and its mounting location within the lens tube 522, which is determined by the second lens' retaining rings 532, 534. It will additionally be appreciated that the spacing of the first lens 553 relative to the optical receptacle 222 affects the collimation of the optics assembly 520. Hence, the optical adjustment screw 528, to which the optical receptacle 512 is coupled, is movably mounted within the lens tube 522, and may be used to adjust the spacing between the first lens 553 and the optical receptacle 222. In a particular preferred embodiment, the inner surface of the lens tube 522 and the outer surface of the optical adjustment screw 528 are each threaded to provide this adjustability function.

Returning once again to a description of the end cap 106, and with reference returned to FIGS. 11 and 12, it is seen that, at least in the depicted embodiment, the end cap 106 includes two filler media flow passages 1114 (only one shown in phantom in FIG. 11), each of which is in fluid communication with one of the main body filler media flow passages 702. The end cap filler media flow passages 1114 each include an inlet port 1106 and an outlet port 1118. When the end cap 106 is coupled to the main body 102, each end cap filler media outlet port 1118 is collocated with one of the main body filler media flow passage inlet ports 702. The end cap filler media inlet ports 1106 may be coupled to receive any one of numerous types of filler media including, but not limited to, those delineated above. The particular filler media used may be fed into one or more of the end cap filler media inlet ports 1106 either manually, or the filler media may be fed automatically from a filler media feed assembly (not shown).

The filler media supplied to the laser welding wand 100 may flow into and through each of the end cap 1114 and main body 602 filler media flow passages via a plurality of tubes. In particular, and with a quick reference once again to FIG. 5, it is seen that a plurality of filler media liner tubes 550 are provided. These filler media liner tubes 550 may be inserted, one each, through one of the end cap filler media flow passages 1114, and into the main body filler media flow passages 702. The filler media liner tubes 550 further guide the filler media into and through the end cap 106 and main body 102, and into the nozzle filler media flow passages 1002. The filler media liner tubes 550 also protect each of the filler media openings and flow passages against any erosion that could result from filler media flow or movement through the openings and flow passages. Although use of the filler media liner tubes 550 is preferred, it will be appreciated that the wand 100 could be used without the filler media liner tubes 550.

The end cap 106, as was previously noted, also includes two coolant ports. In particular, the end cap 106 includes a coolant inlet port 1108 and a coolant outlet port 1110. The end cap coolant inlet port 1108 is in fluid communication with each of the main body coolant inlet ports 704, via a plurality of coolant inlet flow passages 1402 (see FIG. 14). Similarly, the end cap coolant outlet port 1110 is in fluid communication with each of the main body coolant outlet ports 706, via a plurality of coolant outlet flow passages. For clarity, the end cap coolant outlet flow passages are not illustrated. However, it will be appreciated that these flow passages are configured substantially identical to the coolant inlet flow passages 1402. Thus, coolant supplied to the end cap coolant inlet port 1108 is directed through the end cap coolant flow passages 1402, and into and through the main body coolant flow passages 704. In the main body 102, the coolant flows as described above. The coolant exiting the main body coolant outlet ports 706 is directed into and through the end cap coolant outlet flow passages, and out the end cap coolant outlet port 1110.

Figure 13:
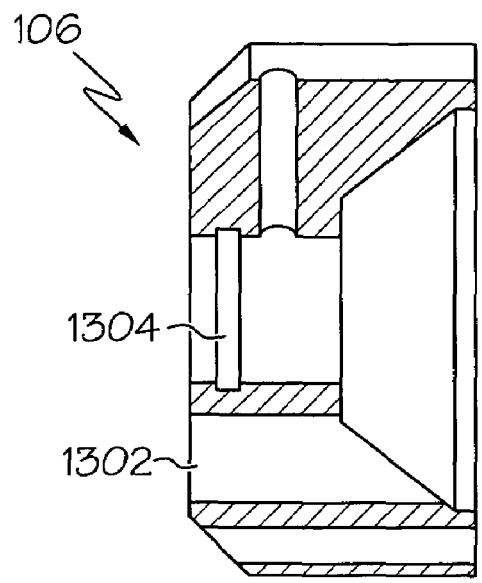
FIGS. 13 and 14 are cross section views of the exemplary end cap taken along lines 12-12 and 13-13 of FIGS. 10 and 11, respectively.
Figure 14:
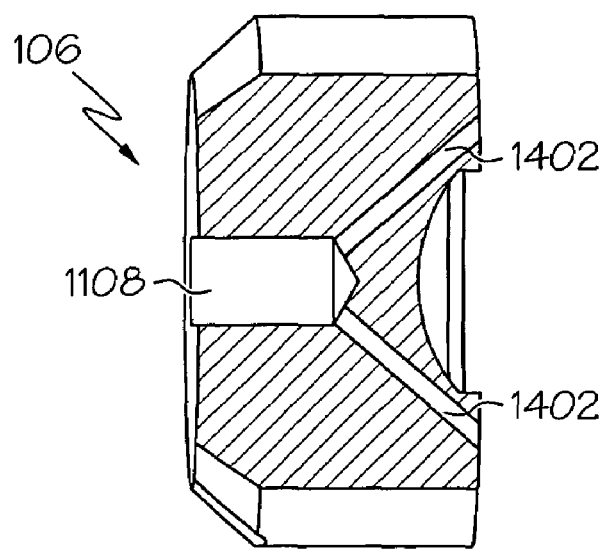

The gas supply port 1112 directs an inert gas such as, for example, Argon, into the main body gas flow passages 806, via an end cap gas flow passage 1302 (see FIG. 13). The end cap gas flow passage 1302, in the depicted embodiment, fluidly communicates the end cap gas supply port 1112 with the end cap cable opening 1104. The end cap cable opening 1104, as was noted above, is in fluid communication with the main body gas flow passage inlet ports 708. Thus, gas supplied to the end cap gas supply port 1112 is directed through the end cap gas flow passage 1302, and into the end cap cable opening 1104. A seal, such as a non-illustrated O-ring seal, prevents the gas entering the end cap cable opening 1104 from flowing back out the end cap 106. The seal is preferably placed in an O-ring groove 1304 formed on an inner surface of the cable opening 1104, and through which the optical cable 508 passes. Thus, the gas directed into the end cap cable opening 1104 is directed into the main body gas flow passage inlet ports 708, through the main body gas flow passages 606, and into the nozzle 104. The gas is then directed out the nozzle aperture 414.

The gas lens assembly 108 is additionally coupled to the wand 100. The gas lens assembly 108 is used to reflect laser light that may be reflected off a work piece back toward the wand 100, and to provide an inert gas shield around a weld pool on a work piece. A description of the specific configuration of the gas lens assembly is not needed, and will thus not be further described in detail.

The hand-held laser welding wand 100 described herein includes a plurality of internal flow passages that allow filler media, gas, and coolant to flow through the wand 100. The flow passages are conveniently connectable to external filler media, gas, and coolant supply sources, which allows the wand 100 to be operated and manipulated with reduced impairment from these external systems, thereby providing improved operability. The wand 100 is also configured to provide improved serviceability for the optics assembly 520, in that the nozzle 104 is readily removable via the threaded nozzle retainer ring 402 and portions of the lens assembly 520, such as the lenses 524, 526, may be readily removed for maintenance by removing the threaded retaining ring stop 530. Moreover, the coolant flow passages $604_{INLET}$, $604_{OUTLET}$, and the crossover flow channels 808 are fixedly sealed. Thus, the optics assembly 520 may be readily serviced without having to breach coolant seals or remove a plurality of threaded screws. As a result, optics assembly serviceability is relatively simpler, less time consuming, and relatively less costly.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A hand-held laser fusion welding assembly adapted to couple to a laser delivery system, a gas supply system, and a liquid coolant supply system, the assembly comprising:
   a nozzle having an aperture through which laser light from the laser delivery system and gas from the gas delivery system passes;

a main body dimensioned to be grasped by a hand and adapted to couple to the laser delivery system, the gas supply system, and the liquid coolant supply system, the main body having a first end and a second end, the main body first end coupled to the nozzle, the main body including:
a gas flow passage extending through the main body, the gas flow passage including a gas inlet port formed in the main body second end, and a gas outlet port formed in the main body first end and in fluid communication with the nozzle aperture;
a plurality of liquid coolant inlet flow passages formed in the main body, each liquid coolant inlet flow passage having a liquid coolant inlet port formed in the main body second end and extending, from the main body second end, at least partially into the main body toward the main body first end, to a fixedly sealed end;
a plurality of liquid coolant outlet flow passages formed in the main body, each liquid coolant outlet flow passage having a liquid coolant outlet port formed in the main body second end and extending, from the main body second end, at least partially into the main body toward the main body first end, to a fixedly sealed end; and
a plurality of fixedly sealed crossover channels formed within the main body that couples the ends of pairs of the liquid coolant inlet and liquid coolant outlet flow passages in fluid communication with one another.

2. The assembly of claim 1, wherein the main body further includes a plurality of grooves formed in the first end, wherein the crossover channels and the liquid coolant inlet and outlet flow passage ends are each formed in one of the grooves and spaced from the main body first end, and wherein the assembly further comprises:
a plurality of cross over channel covers, each cover disposed within, and fixedly coupled to, one of the grooves to thereby fixedly seal one of the crossover channels.

3. The assembly of claim 1, wherein each crossover channel is integrally formed within the main body.

4. The assembly of claim 1, further comprising:
a retainer ring coupled to the main body and the nozzle, the retainer ring configured to couple the nozzle to the main body first end.

5. The assembly of claim 4, wherein:
the main body includes a plurality of threads formed on an outer surface thereof proximate the first end;
the retainer ring includes a plurality of threads formed on an inner surface thereof, the retainer ring threads configured to mate with the main body threads; and
the retainer ring is threaded on the main body first end.

6. The assembly of claim 1, further comprising:
an end cap coupled to the main body second end, the end cap including:
an optical cable opening adapted to receive an optical cable,
a gas flow passage in fluid communication with the main body gas flow passage,
a plurality of liquid coolant inlet flow passages each in fluid communication with one of the main body coolant inlet flow passages, and
a plurality of liquid coolant outlet flow passages in fluid communication with one of the main body liquid coolant outlet flow passages.

7. The assembly of claim 6, further comprising:
one or more filler media delivery flow passages extending through the main body; and
one or more filler media delivery flow passages extending through the end cap, each end cap filler media delivery flow passage adapted to receive a filler media therein, and each in fluid communication with one of the main body filler media delivery flow passages.

8. The assembly of claim 7, further comprising:
one or more filler media liner tubes, each liner tube disposed at least partially within one of the end cap filler media delivery flow passages and one of the main body filler media delivery flow passages.

9. The assembly of claim 1, further comprising:
an optics assembly mounted within the main body and configured to focus the laser light from the laser delivery system on a point in front of the nozzle aperture.

10. The assembly of claim 9, wherein the optics assembly comprises:
a lens conduit having at least a first end and a second end;
a first lens mounted within the lens conduit adjacent the lens conduit first end, the first lens configured to collimate the laser light from the laser delivery system; and
a second lens mounted within the lens conduit adjacent the lens conduit second end, the second lens configured to focus the collimated laser light on the point in front of the nozzle aperture.

11. The assembly of claim 10, wherein at least the first lens is movably mounted within the lens conduit, and wherein the assembly further comprises:
a receptacle assembly mounted within the main body adjacent the lens conduit first end, the receptacle assembly adapted to receive an optical cable through which the laser light from the laser delivery system is transmitted; and
an optical adjustment screw movably mounted within the lens conduit adjacent the first lens, the optical adjustment screw configured to adjust a spacing between the first lens and the receptacle assembly, whereby the collimation of the delivered laser light is adjustable.

12. A laser fusion welding system, comprising:
a gas supply system configured to supply a flow of gas;
a liquid coolant supply system configured to supply a flow of a liquid coolant medium;
an optical cable coupled to a laser delivery system and configured to transmit laser light therethrough; and
a hand-held laser fusion welding assembly including:
a nozzle having an aperture through which laser light from the laser delivery system and gas from the gas delivery system passes;
a main body dimensioned to be grasped by a hand and coupled to the laser delivery system, the gas supply system, and the liquid coolant supply system, the main body having a first end and a second end, the main body first end coupled to the nozzle, the main body including:
a gas flow passage extending through the main body, the gas flow passage including a gas inlet port formed in the main body second end, and a gas outlet port formed in the main body first end and in fluid communication with the nozzle aperture;
a liquid coolant inlet flow passage having a liquid coolant inlet port formed in the main body second end and extending, from the main body second end, at least partially into the main body toward the main body first end, to a fixedly sealed end;
a plurality of liquid coolant inlet flow passages formed in the main body, each liquid coolant inlet flow passage having a liquid coolant inlet port formed in the main body second end and extending, from the main body second end, at least partially into the main body toward the main body first end, to a fixedly sealed end;

a plurality of liquid coolant outlet flow passages formed in the main body, each liquid coolant outlet flow passage having a liquid coolant outlet port formed in the main body second end and extending, from the main body second end, at least partially into the main body toward the main body first end, to a fixedly sealed end; and a plurality of fixedly sealed crossover channels formed within the main body that couples the ends of pairs of the liquid coolant inlet and liquid coolant outlet flow passages in fluid communication with one another.

13. The assembly of claim 12, wherein the main body further includes a plurality of grooves formed in the first end, wherein the crossover channels and the liquid coolant inlet and outlet flow passage ends are each formed in one of the grooves and spaced from the main body first end, and wherein the assembly further comprises:

a plurality of cross over channel covers, each cover disposed within, and fixedly coupled to, one of the grooves to thereby fixedly seal one of the crossover channels.

14. The assembly of claim 12, wherein each crossover channel is integrally formed within the main body.

15. The assembly of claim 11, further comprising:

a retainer ring coupled to the main body and the nozzle, the retainer ring configured to couple the nozzle to the main body first end.

16. The assembly of claim 15, wherein:

the main body includes a plurality of threads formed on an outer surface thereof proximate the first end;

the retainer ring includes a plurality of threads formed on an inner surface thereof, the retainer ring threads configured to mate with the main body threads; and the retainer ring is threaded on the main body first end.

17. The assembly of claim 12, further comprising:

an end cap coupled to the main body second end, the end cap including:

an optical cable opening adapted to receive an optical cable, a gas flow passage in fluid communication with the main body gas flow passage, a liquid coolant inlet flow passages in fluid communication with the main body liquid coolant inlet flow passage, and a liquid coolant inlet flow passages in fluid communication with the main body liquid coolant inlet flow passage.

18. The assembly of claim 17, further comprising:

one or more filler media delivery flow passages extending through the main body; and one or more filler media delivery flow passages extending through the end cap, each end cap filler media delivery flow passage adapted to receive a filler media therein, and each in fluid communication with one of the main body filler media delivery flow passages.

19. The assembly of claim 18, further comprising:

one or more filler media liner tubes, each liner tube disposed at least partially within one of the end cap filler media delivery flow passages and one of the main body filler media delivery flow passages.

20. The assembly of claim 12, further comprising:

an optics assembly mounted within the main body and configured to focus the laser light from the laser delivery system on a point in front of the nozzle aperture.

21. The assembly of claim 20, wherein the optics assembly comprises:

a lens conduit having at least a first end and a second end;

a first lens mounted within the lens conduit adjacent the lens conduit first end, the first lens configured to collimate the laser light from the laser delivery system; and a second lens mounted within the lens conduit adjacent the lens conduit second end, the second lens configured to focus the collimated laser light on the point in front of the nozzle aperture.

22. The assembly of claim 21, wherein at least the first lens is movably mounted within the lens conduit, and wherein the assembly further comprises:

a receptacle assembly mounted within the main body adjacent the lens conduit first end, the receptacle assembly adapted to receive an optical cable through which the laser light from the laser delivery system is transmitted; and an optical adjustment screw movably mounted within the lens conduit adjacent the first lens, the optical adjustment screw configured to adjust a spacing between the first lens and the receptacle assembly, whereby the collimation of the delivered laser light is adjustable.

* * * * *